United States Patent
Pan et al.

(10) Patent No.: US 6,948,419 B2
(45) Date of Patent: Sep. 27, 2005

(54) COFFEE MAKER

(76) Inventors: Huang Chuan Pan, P.O. Box 2-10, Tainan City (TW); Huang Chen-Lung, P.O. Box 2-10, Tainan City (TW)

( * ) Notice: Subject to any disclaimer, the term of this patent is extended or adjusted under 35 U.S.C. 154(b) by 91 days.

(21) Appl. No.: 10/654,650

(22) Filed: Sep. 4, 2003

(65) Prior Publication Data

US 2005/0051031 A1 Mar. 10, 2005

(51) Int. Cl.⁷ .............................................. A47J 31/047
(52) U.S. Cl. ................................ 99/281; 99/292; 99/303
(58) Field of Search .......................... 99/292, 303, 280, 99/281, 282, 283, 279; 219/438, 521

(56) References Cited

U.S. PATENT DOCUMENTS

| | | | | |
|---|---|---|---|---|
| 2,576,432 A | * | 11/1951 | Wilcox | 99/281 |
| 4,967,061 A | * | 10/1990 | Weber et al. | 219/438 |
| 6,536,331 B2 | * | 3/2003 | Jorgensen | 99/292 |
| 6,578,467 B1 | * | 6/2003 | Taylor et al. | 99/281 |
| 6,752,071 B1 | * | 6/2004 | Snyder | 99/323.5 |

* cited by examiner

*Primary Examiner*—Reginald L. Alexander

(57) ABSTRACT

A coffee maker includes a body provided with a water storing space and a handle, and a heater positioned under the water storing space. The heater is made of an insulating plate and an electrically heating film formed on a lower surface of the insulating plate. Then the heat generated by the electrically heating film heats up the water in the water storing space of the body for making coffee.

9 Claims, 6 Drawing Sheets

COFFEE MAKER

FIELD OF THE INVENTION

This invention relates to a coffee maker, particularly to one safe to use, fast to heat up and of highly heat-effective.

BACKGROUND OF THE INVENTION

A common conventional coffee maker shown in FIG. 1 includes a body 1 provided with a water storing space 14, and a heater 10 provided under the water storing space 14.

The heater 10 consists of a metal plate 11 and an electrical heating tube 12 wrapped in the metal plate 11. Then the heating tube 12 is powered to generate heat, which is then transmitted to the metal plate to boil up the water in the water storing space 14 in the body 1 for making coffee.

However, the conventional coffee maker has the following disadvantages.

1. As the metal plate directly wraps up the electrically heating tube 12, it has to be provided with extremely good insulating effect, otherwise it would be dangerous to use this conventional coffee maker.

The heat generated by the electrically heating tube 12 has to be transmitted to the metal plate, and then to the water in the water storing space 14, having inferior heat transmission by means of the small dimension contact between the heating tube 12 with the metal plate 11.

SUMMARY OF THE INVENTION

This invention has been devised to offer a coffee maker having high heat transmission, not to heat up without water in a water storing space, and quite safe to use.

The coffee maker in the invention has the following features.

1. It has a heater consisting of an insulating plate formed with an electrically heating film on a lower surface of the insulating plate by means of thermal plating, having a wide heating dimension.

2. It can additionally have a heat-conducting metal plate positioned on the insulating plate of the heater and having high heat transmission and safety in use.

3. It can additionally have a temperature sensor and a temperature fuse to ensure no heating without water in the water storing space and safety in use.

4. The metal plate can have a temperature sensor groove for receiving a temperature sensor to sense a low water level in the water storing space so as to defend lack of water.

5. The heater can be positioned in a slanting condition to the body so as to quickly check out a low water level.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
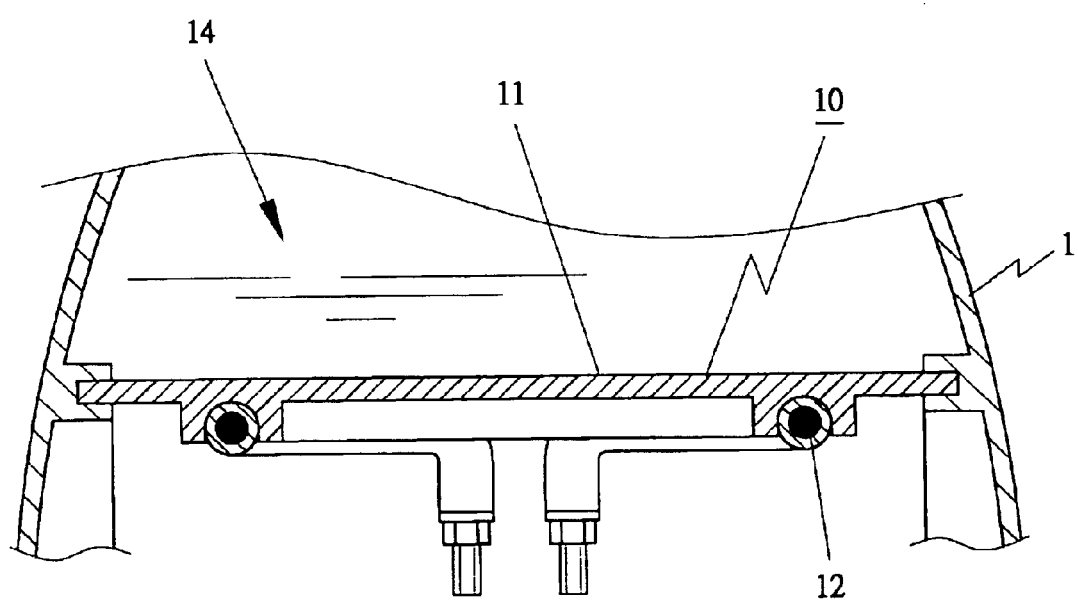
FIG. 1 is a partial cross-sectional view of a conventional coffee maker.
Figure 2:
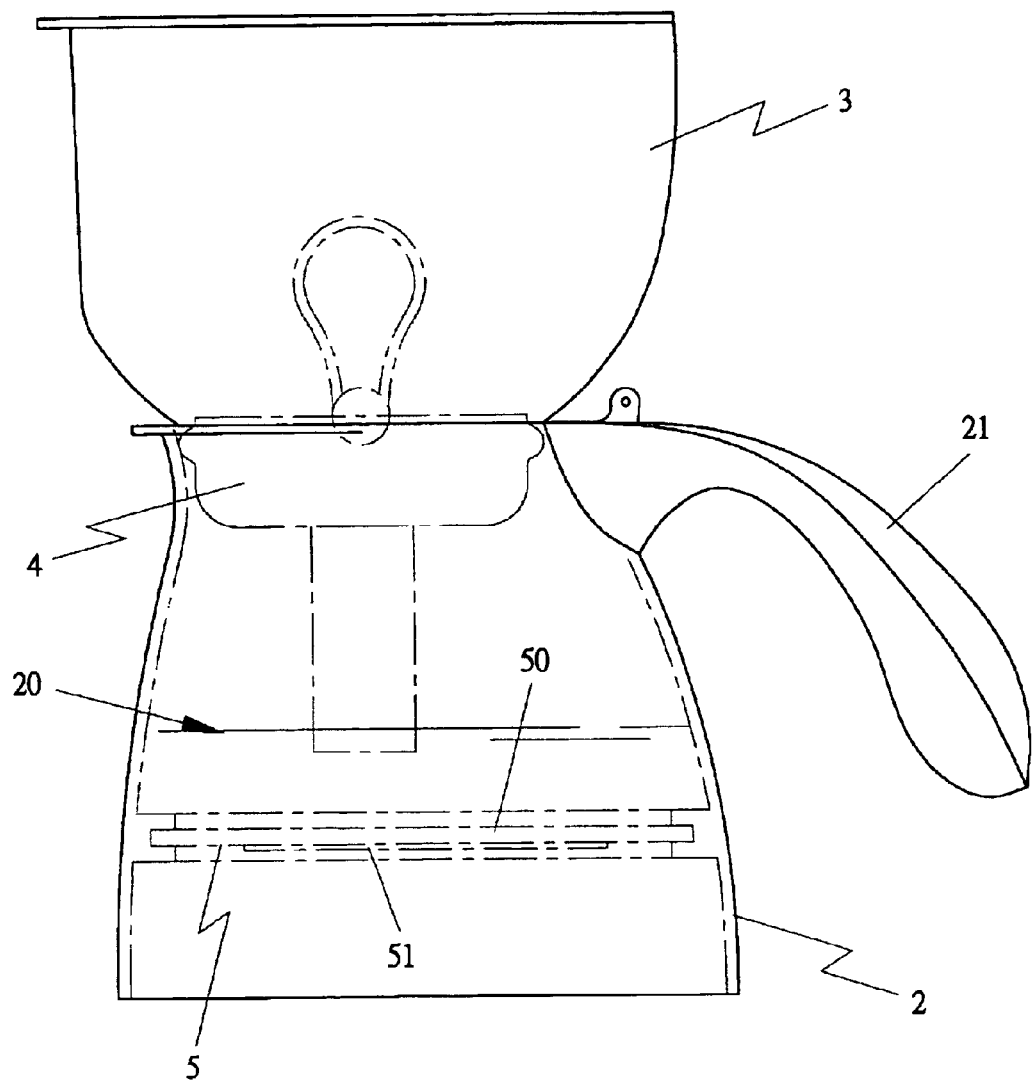
FIG. 2 is a cross-sectional view of a coffee maker in the present invention.

A first embodiment of a coffee maker in the present invention, as shown in FIG. 2, includes a body 2, a water storing space 20 formed in the body 2, a handle 21 fixed on an outer surface of the body 2, a coffee cup 3 for storing coffee powder, a siphon device 4 positioned in an upper portion of the water storing space 20, and a heater 5 provided under the water storing space 20 as main components.

The components except the heater 5 are almost of the same structure of the conventional coffee maker, not described here.

Figure 3:
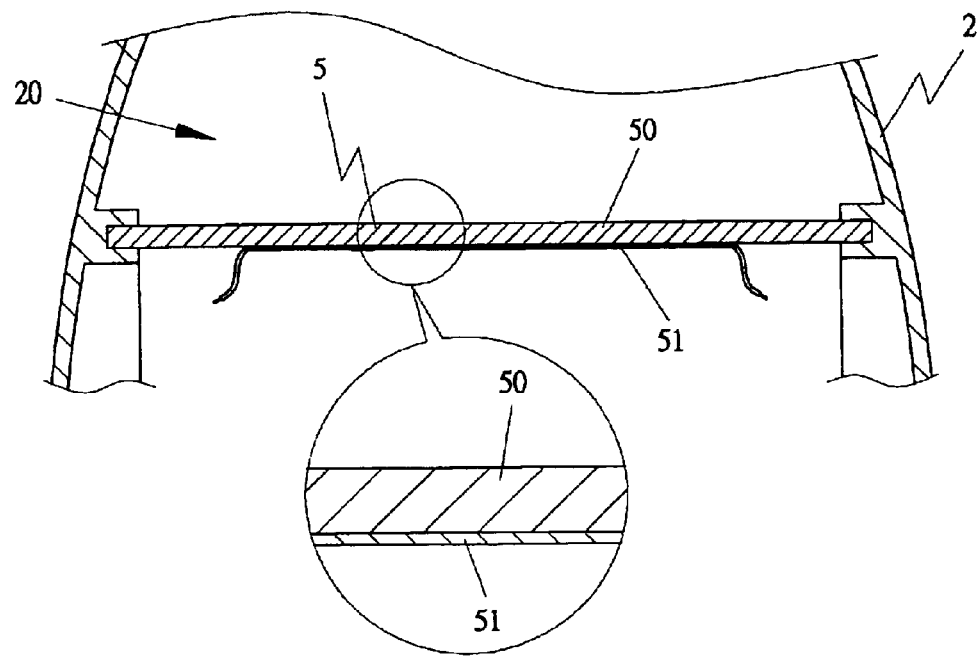
FIG. 3 is a partial cross-sectional and a partial magnified view of a first embodiment of a coffee maker in the present invention.

The heater 5 of the first embodiment shown in FIG. 3 consists of an insulating plate 50 fixed with the body 2 and an electrically heating film 51 thermo-plated on a lower surface of the insulating plate 50. The insulating plate 50 can prevent water from percolating there through, made of micro-crystal glass, porcelain, quarts glass or heat-enduring plastic with electrically insulating function. The electrically heating film 51 formed on the lower surface of the insulating plate 50 has a large dimension of heating so as to give out high heat to be transmitted to the insulating plate 50, very safe to use owing to separation from the water in the water storing space 20 by the insulating plate 50.

Figure 4:
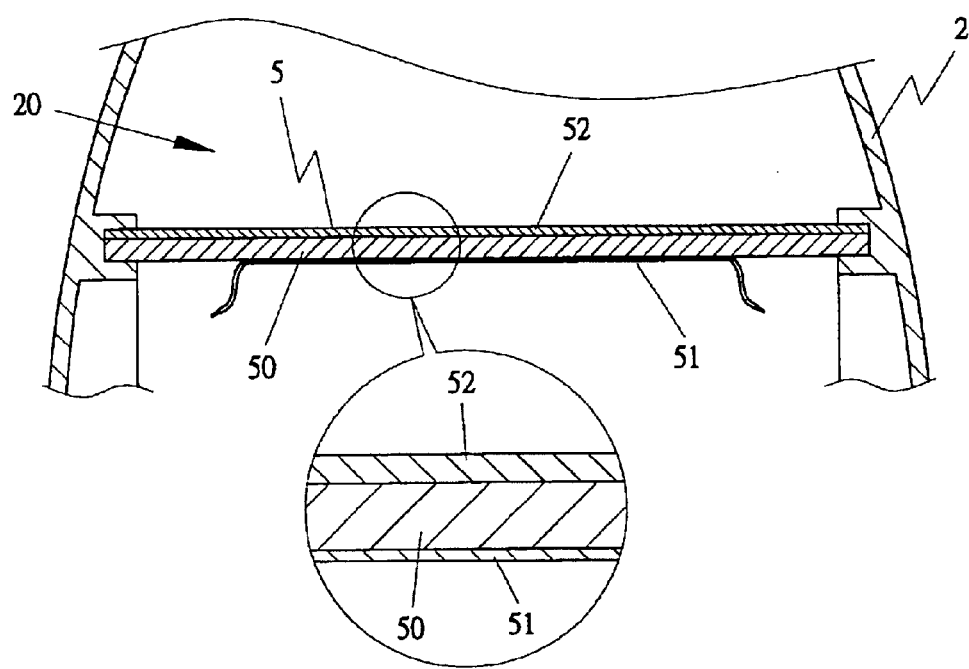
FIG. 4 is a partial cross-sectional and a partial magnified view of a second embodiment of a coffee maker in the present invention.

A second embodiment of a coffee maker in the invention is shown in FIG. 4, modified from the first embodiment, and additionally having a heat-conductive metal plate 52 fixed on the insulating plate 50 and made of stainless steel, aluminum, copper or the like with high conductivity of heat.

Figure 5:
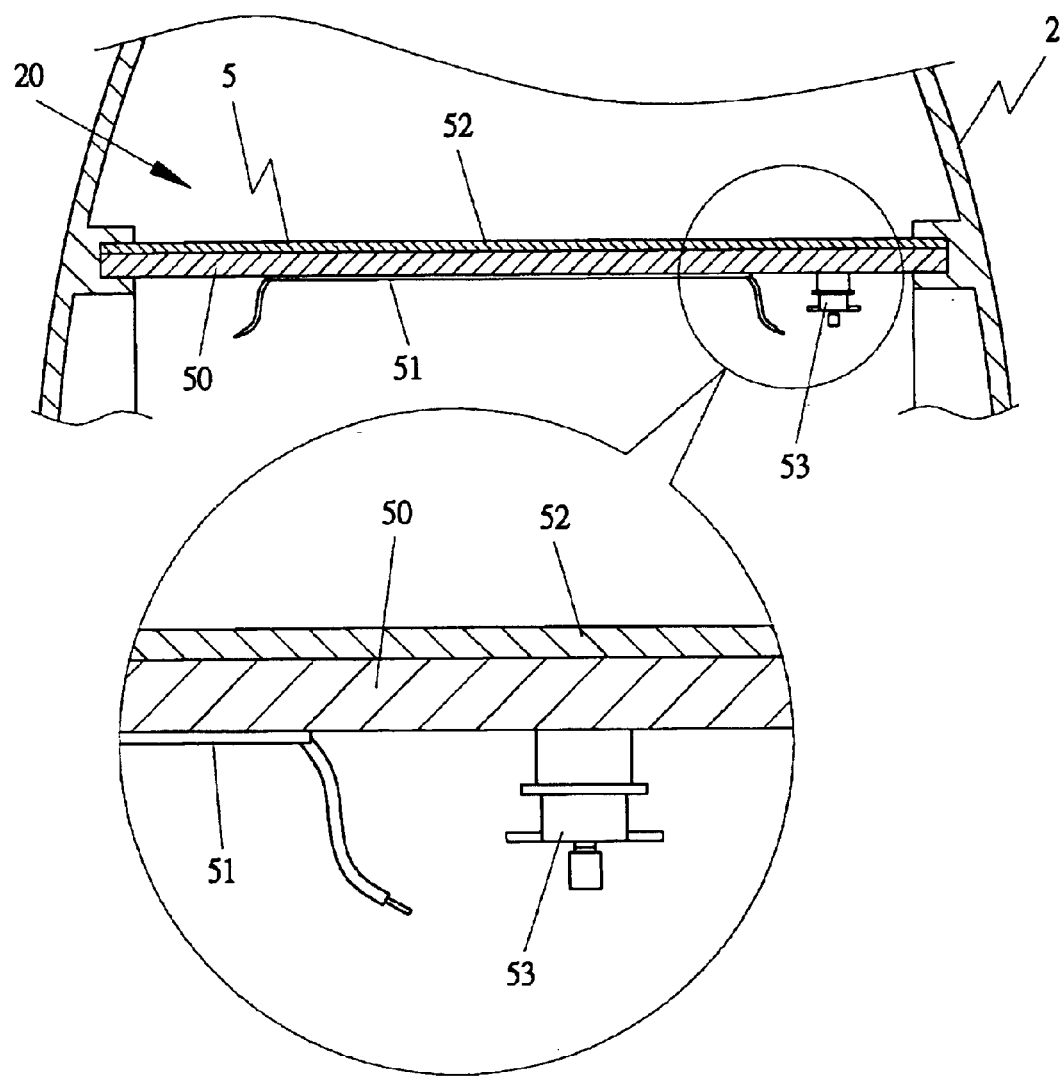
FIG. 5 is a partial cross-sectional and a partial magnified view of a third embodiment of a coffee maker in the present invention.

Next, a third embodiment of a coffee maker in the invention is shown in FIG. 5, modified from the first and the second embodiment, and additionally having a temperature sensor with a temperature fuse 53 fixed under the heater 5 for controlling the temperature generated for heating up the water in the water storing space 20 so as to let the coffee maker controlled automatically.

Figure 6:
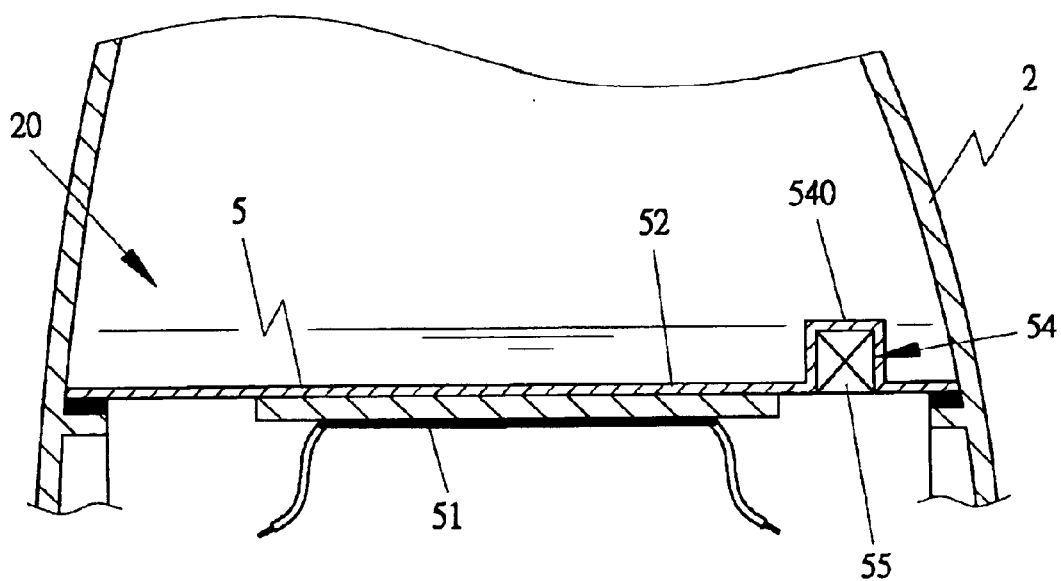
FIG. 6 is a partial cross-sectional and a partial magnified view of a fourth embodiment of a coffee maker in the present invention.

Further, FIG. 6 shows a fourth embodiment of a coffee maker in the invention, which is modified from the second embodiment, having the heat-conductive metal plate 52 further provide with a temperature sensor groove 54 defined by a side wall with an upper surface 540 higher than the highest level in the water storing space 20. Then if the water level in the water storing space becomes lower than the upper surface 540 of the side wall, the temperature of the upper surface 540 will turn out to be higher, which is then sensed by the temperature sensor 55. Then the power of the heater 5 can be cut off by the temperature sensor 55, preventing the coffee maker from heated up with no water in the water storing space 20.

Figure 7:
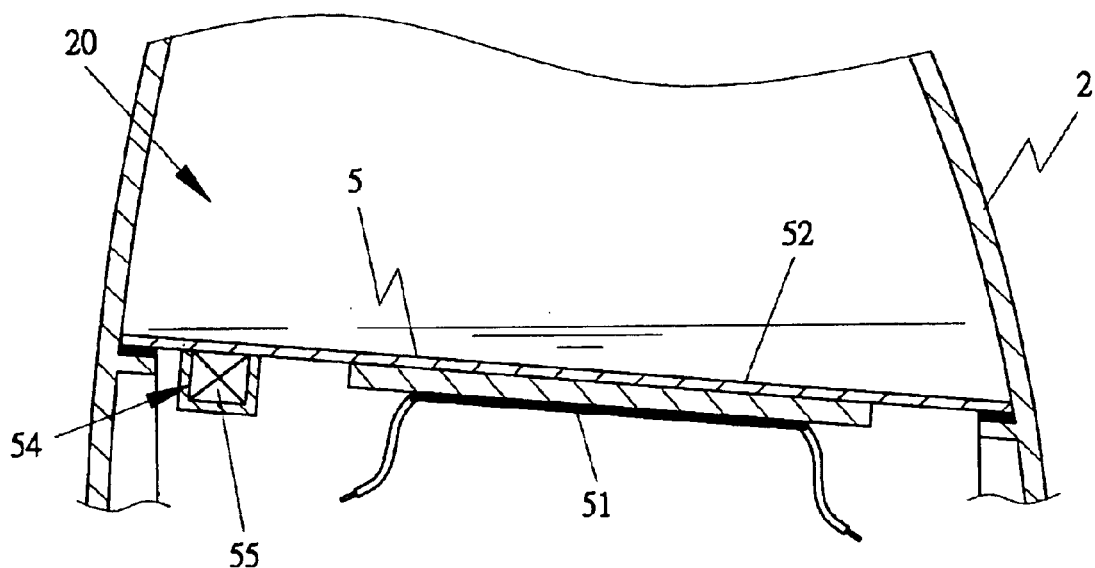
FIG. 7 is a partial cross-sectional and a partial magnified view of a fifth embodiment of a coffee maker in the present invention; and, FIG. 8 is a partial cross-sectional and a partial magnified view of a sixth embodiment of a coffee maker in the present invention.

Next, FIG. 7 shows a fifth embodiment of a coffee maker in the invention, which is modified from the second and the fourth embodiment, having the metal plate 52 with the temperature sensor groove 54 formed under the metal plate 52 and positioned slanting relative to the body 2 so as to let the position of the side wall of the groove 54 is higher than the other side of the groove 54. Then when the water level in the water storing space 20 becomes lower than that of the upper surface 540 of the side wall, the temperature of the upper surface 540 will turn out to be higher, which the sensor 55 can sense out so as to cut the power of the heater 50 to keep the coffee maker safe, not continuing to heat up with no water.

Figure 8:
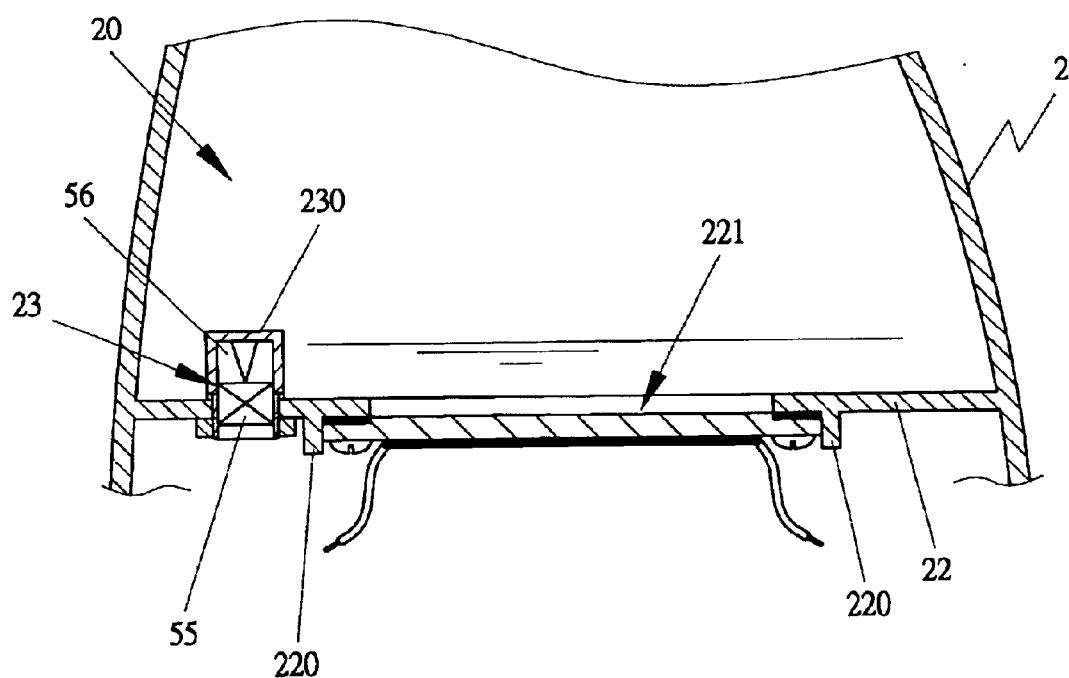

Further, FIG. 8 shows a sixth embodiment of a coffee maker in the invention, modified from the first and the fourth embodiment, having additionally a bottom plate 22 for the body 2. The bottom plate 22 is provided with a same temperature sensor groove 23 as those in the previous embodiments, positioned on the bottom plate 22. The bottom plate 22 further has a heater fixing base 220 with a center hole 221 so that the heater 5 may be fixed with the bottom plate 22 in the heater fixing base 220 just under the center hole 221, and additionally with a small heater 56 received within the sensor groove 23 and the temperature sensor 55 placed just under the small heater 56. Thus when the water level of the water storing space 20 becomes lower than that of the upper surface 230 of the side wall of the sensor groove 23, the small heater 56 has the heat not transmitted to the water so as to let the upper surface 230 of the side wall raise its temperature. Then the temperature sensor 55 senses it out to cut off the power of the heater 5, attaining the object of temperature control and keeping the coffee maker safe, not keeping on heating up without water in the water storing space 20.

While the preferred embodiments have been described above, it will be recognized and understood that various modifications may be made therein and the appended claims are intended to cover all such modifications that may fall within the spirit and scope of the invention.

What is claimed is:

1. A coffee maker comprising:
   a body provided with a water storing space and a handle, and a coffee cup positioned on said body for storing coffee powder therein;
   a heater positioned under said water storing space in said body, having an insulating plate, an electrically heating film on a lower surface of said insulating plate, a heat-conducting metal plate fixed on said insulating plate and formed with a temperature sensor groove for receiving a temperature sensor, the temperature sensor sensing a water level in said water storing space by measuring local temperature change in said temperature sensor groove as the water level changes and controlling the temperature generated by said heater so as to keep said coffee maker safe in using.

2. The coffee maker as claimed in claim 1, wherein said temperature sensor groove is positioned above the upper surface of said heat-conductive metal plate.

3. The coffee maker as claimed in claim 1, wherein said temperature sensor groove is positioned below the upper surface of said heat-conductive metal plate.

4. The coffee maker as claimed in claim 1, wherein said heater is positioned slanting relative to said body.

5. The coffee maker as claimed in claim 1, wherein said heat-conductive metal plate is positioned slanting relative to said body.

6. A coffee maker comprising:
   a body provided with a water storing space and a handle, a coffee cup positioned on said body, said body having a bottom plate provided with a temperature sensor groove, a first heater and a temperature sensor received in said temperature sensor groove, said bottom plate provided with a heater base bored with a center hole;
   a second heater positioned under said bottom plate of said body, having an insulating plate and an electrically heating film on a lower surface of said insulating plate.

7. A coffee maker comprising:
   a body provided with a water storing space and a coffee cup positioned on said body for storing coffee powder therein;
   a heater positioned under said water storing space in said body, said heater having an insulating plate and an electrically heating film on a lower surface of said insulating plate, a temperature sensor groove for receiving a temperature sensor being provided at bottom of said body, wherein the temperature sensor senses a water level in said water storing space by measuring local temperature change in said temperature sensor groove as the water level changes and controls the temperature generated by said heater so as to keep said coffee maker safe in using.

8. The coffee maker as claimed in claim 7, wherein said temperature sensor groove is positioned above the upper surface of said insulating plate.

9. The coffee maker as claimed in claim 7, wherein said temperature sensor groove is positioned below the upper surface of said insulating plate, and said insulating plate is positioned slanting relative to said body.

* * * * *